United States Patent [19]

Ogg

[11] Patent Number: 4,495,019

[45] Date of Patent: Jan. 22, 1985

[54] PLYWOOD BENDING

[76] Inventor: Richard Ogg, R.R. 3, Box 38, Littlestown, Pa. 17340

[21] Appl. No.: 380,756

[22] Filed: May 21, 1982

[51] Int. Cl.[3] .............................................. B29C 19/02

[52] U.S. Cl. ................................ 156/222; 144/256.1; 144/256.3; 144/319; 156/275.5; 156/323; 156/180; 156/581

[58] Field of Search .......................... 144/256.1-256.4, 144/349, 381; 156/196, 221-224, 272.2, 275.5, 580-581, 583.1, 323

[56] References Cited

U.S. PATENT DOCUMENTS

| | | | |
|---|---|---|---|
| 119,393 | 9/1871 | Ocorr | 144/256.3 X |
| 687,144 | 11/1901 | Fenn . | |
| 707,221 | 8/1902 | Fenn . | |
| 728,890 | 5/1903 | Fenn | 144/256.3 |
| 966,678 | 8/1910 | Fisher . | |
| 1,016,684 | 2/1912 | Fisher . | |
| 2,073,290 | 3/1937 | Teague | 144/281 |
| 2,308,453 | 1/1943 | Potchen et al. | 144/281 |
| 2,322,962 | 6/1943 | Dickson et al. | 144/259 |
| 2,401,299 | 6/1946 | Glavin | 144/281 |
| 3,027,923 | 4/1962 | Schreiber | 144/256.1 |
| 3,063,483 | 11/1962 | Schumacher | 144/266 |
| 3,107,708 | 10/1963 | Savage | 144/349 X |
| 3,833,333 | 9/1974 | Britten | 425/406 |
| 3,835,904 | 9/1974 | Sumner | 144/349 |
| 4,018,642 | 4/1977 | Pike et al. | 156/272.2 |

*Primary Examiner*—David Simmons

*Attorney, Agent, or Firm*—Cushman, Darby & Cushman

[57] ABSTRACT

An integral wood veneer strip having first, second, and third mutually generally perpendicular portions is produced simply and easily. A number of similarly shaped thin strips of wood, with adhesive between them, are placed together to form a linear laminate. Before curing of the adhesive, the laminate is placed in contact with a particularly contoured female die surface, with a flexible band over the laminate. A male die surface provides a pressing force at a central portion of the band to press the laminate into close conformance with the female die surface, and the ends of the band are attached up to rollers. The rollers are rotated to tighten the ends of the band, also bringing the ends of the laminate into tight contact with the female die surface. The adhesive is cured while the laminate is in the bent position (the curing may be facilitated by using microwaves), and then the laminate is released after curing, and may be utilized as decorative molding for furniture.

16 Claims, 4 Drawing Figures

PLYWOOD BENDING

BACKGROUND AND SUMMARY OF THE INVENTION

The invention relates to a method and apparatus for making a strip of laminated material, and the strip so produced, having a three dimensional configuration. The invention is particularly applicable to the formation of wood veneer for furniture making and the like, as for also structural molding strips provided on such furniture.

In the art, conventionally veneer strips are formed by forming flat blankets which are cut into strips and jointed, or otherwise acted upon, in order to form the strips into the desired configuration, such as a molding on a piece of furniture. There are prior art proposals to make laminated structures having three dimensional configurations (e.g. see U.S. Pat. Nos. 3,027,923 and 3,063,483), however such proposals do not lend themselves to the formation of a wide variety of shapes and configurations of veneer strips, such as are used for molding for pieces of furniture and the like.

According to the present invention, a method and apparatus are provided which facilitate the simple, quick production of strips of laminated material having a wide variety of configurations, and particularly strips useful for wood veneer molding for furniture. The strips of laminated material produced according to the present invention have first and second generally perpendicular portions, and a third portion generally perpendicular to both the first and second portions. The term "generally perpendicular" as used in the present specification and claims means that the portions are approximately perpendicular, although there is no requirement that they be exactly perpendicular, and in fact they may have a wide variety of configurations, depending upon ultimate use.

According to the method of the present invention, a strip of laminated material, such as a wood veneer strip, is produced by practicing the following steps: A plurality of similarly shaped strips of material are placed together, with adhesive, to form a linear laminate. Before curing of the adhesive, the linear laminate is bent to form a first portion, a second portion generally perpendicular to the first portion, and a third portion generally perpendicular to both the first and second portions. The laminate is held in the bent position during curing thereof, and after curing the laminate is released, providing a final strip of laminated material with first, second, and third mutually generally perpendicular portions. The strip of laminated material so produced may be fitted to a piece of furniture, providing decorative molding defining an edge of the piece of furniture. In this way a wide variety of configurations of laminated strips can be produced, minimizing the number of individual strips that must be joined together to form the complete molding, and maximizing the number of practical shapes the molding may assume. Total production time for producing a given final object can thus be substantially reduced.

The apparatus for practicing the invention comprises a first roller rotatable about a first axis and a second roller rotatable about a second axis, the second axis being distinctly non-parallel with the first axis. A female die surface extends continuously from the first roller to the second roller. A flexible band of substantially non-deformable material has a length greater than the length of the female die surface extending between the rollers, and means are provided for attaching the ends of the flexible band to the rollers. Means are provided for rotating the rollers about their axes of rotation with the band held thereby to tension the band and cause the band to closely conform to the shape of the female die surface. A male die member is placed over portions of the band, and a loading is applied thereto, in order to provide a force acting upon a central portion of the strips to hold them into contact with the female die surface. The strips to be formed into the strip of laminated material are placed between the female die surface and the band, the band applying a substantial pressure forcing portions of the strip exterior of the male die to conform to the shape of the female die surface. The first and second axes are preferably stationary with respect to each other.

A strip of wood veneer produced according to the present invention includes first, second, and third mutually generally perpendicular portions, the strip being integral and having curved portions interconnecting the various perpendicular portions. Any number of additional further generally mutually perpendicular portions may be provided depending upon the desired ultimate shape and use of the formed strip.

It is the primary object of the present invention to provide a simple and effective method and apparatus for forming a wide variety of three dimensional strips of laminated material, such as wood veneer. This and other objects of the invention will become clear from an inspection of the detailed description of the invention, and from the appended claims.

DETAILED DESCRIPTION OF THE DRAWINGS

Figure 1:
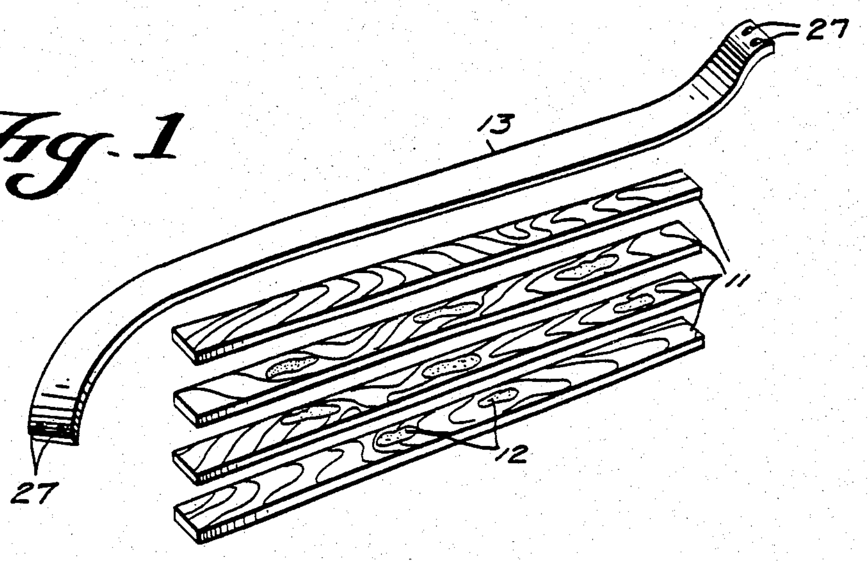
FIG. 1 is a perspective exploded view showing wood strips assembleable to form a laminate according to the invention, and in association with a flexible band utilized to form a laminated strip according to the invention.
Figure 4:
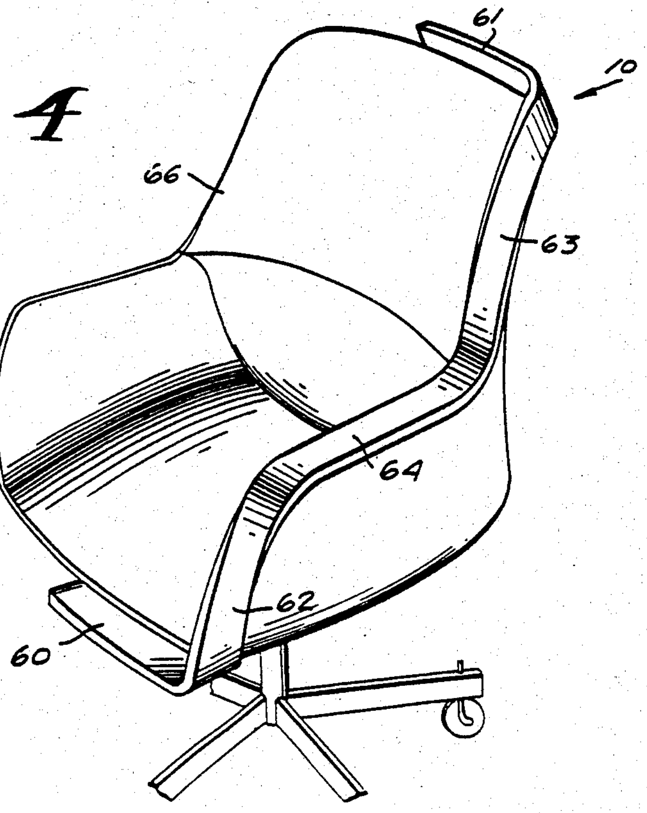
FIG. 4 is a perspective view showing an exemplary laminated material strip according to the present invention shown as a molding piece of a chair.

The invention relates to the formation of a final strip of laminated material, shown generally by reference numeral 10 in FIG. 4, which may have a wide variety of configurations, and is particularly adaptable for use as molding for pieces of furniture and the like. The strip 10 according to the present invention is formed from a plurality of similarly shaped thin strips of wood, shown by reference numeral 11 in FIG. 1. A suitable adhesive, shown schematically by reference numeral 12, is provided between each of the wood strips 11, and they are assembled together to form a linear laminate.

Typically the wood strips 11 would be between about $\frac{1}{8}$ and 1/28 inches thick, and would normally be thin, on the order of about 1–4 inches. The strip width would be dictated by the smallest radius dimension necessary in the end product produced, a minimum radius of about $\frac{3}{4}$ of an inch being possible.

Figure 2:
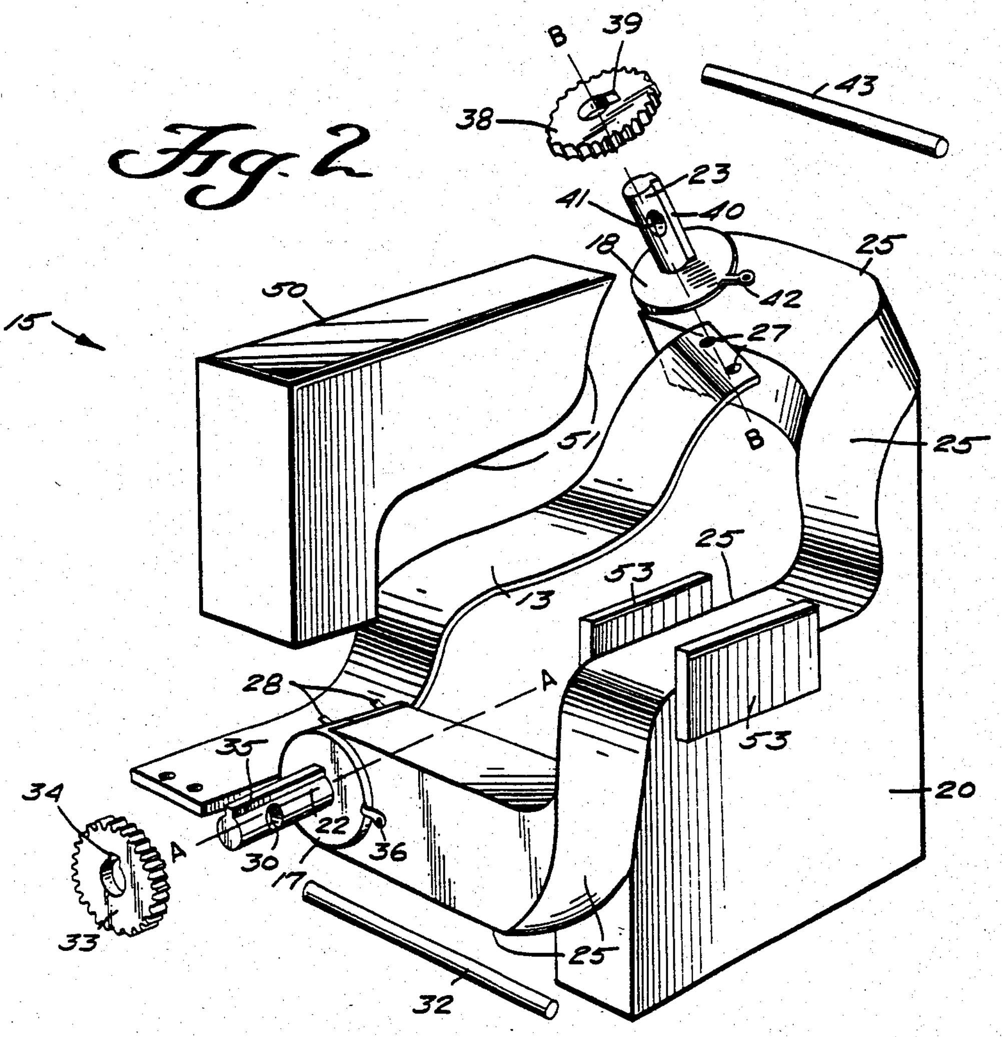
FIG. 2 is a perspective exploded view of exemplary apparatus according to the present invention.
Figure 3:
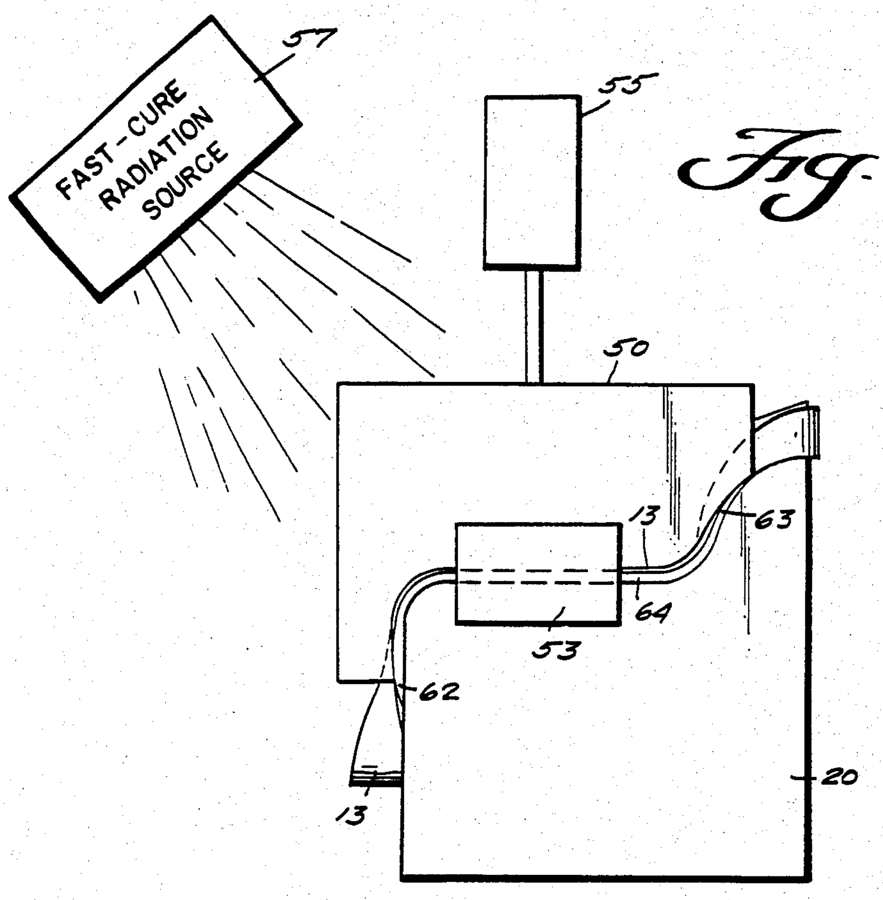
FIG. 3 is a front assembled view of the apparatus of FIG. 2.

A flexible band of substantially non-deformable material 13 is utilized in association with the apparatus 15 illustrated in FIGS. 2 and 3, to apply a force to the strips 11 during curing of the adhesive 12 to form an ultimate laminated strip 10. The band 13 preferably is of woven nylon or a material having like durability and inextensibility.

The apparatus 15 according to the present invention is illustrated in FIGS. 2 and 3, and includes a first roller 17 rotatable about a first axis A—A, and a second roller 18 rotatable about a second axis B—B. During normal use the axes B—B, A—A are stationary with respect to each other. The second axis is distinctly non-parallel to the first axis, normally being skew with respect to the first axis. The rollers 17, 18 are mounted for rotation with respect to a stationary component 20 by any suitable means, such as an arm and bushing (not shown) extending from the stationary block 20 and receiving the first shaft 22 associated with first roller 17, and another such structure receiving the second shaft 23 associated with the second roller 18.

A female die surface 25 extends continuously from the first roller 17 to the second roller 18, the end terminations of the surface 25 being substantially tangent to the rollers 17, 18. The construction of the female die surface 25, which is part of the stationary block 20, corresponds to the construction of the final strip of laminated material 10 to be formed. The length of the surface 25 is at least slightly greater than the length of the strip 10, and the length of the flexible band 13 is greater than the length of the surface 25.

Means are provided for attaching the ends of the band 13 to the rollers 17, 18. The attachment of the ends of the band 13 to the rollers 17, 18 can be accomplished in any conventional manner, such as by providing a slot in each roller surface for receipt of a band end, a fastening material, or the like. One exemplary manner illustrated in the drawings comprises forming a plurality of openings 27 at each end of the band 13. Metal eyelets may be provided in the openings 27. The openings 27 are adapted to cooperate with projections extending radially from the surfaces of the rollers 17, 18, such as the projections 28 schematically illustrated in association with first roller 17 in FIG. 2.

The apparatus 15 further comprises means for rotating the rollers about their axes with the band 13 held thereby to tension the band and cause the band to closely conform to the shape of the die surface 25. The exemplary form of rotating means illustrated in the drawings includes a passageway 30 in first shaft 22 adapted to receive a bar 32, an application of a force to the bar 32 resulting in rotation of the shaft 22, and thus the first roller 17. In order to hold the roller 17 into a position to which it has been moved to tension the band 13, a pawl and ratchet arrangement also may be provided. Pawl gear 33 having a keyway 34 formed therein is adapted to fit over the shaft 22 and key 35 thereof, so that rotation of shaft 22 results in rotation of ratchet gear 33. A conventional pivotally mounted spring biased pawl 36 is mounted on block 20 for cooperation with the teeth of the gear 33 to hold the roller 17 in the position to which it has been rotated. A like pawl and ratchet arrangement is also associated with the second roller 18, including ratchet gear 38 having keyway 39, key 40 on shaft 23, interior passageway 41 through shaft 23, pawl 42, and bar 43.

For most configurations of laminated strips 10 to be produced, such as the long multi-surface configuration of strip 10 in FIG. 4 (and corresponding configuration of the die 25 illustrated in FIG. 2), a male die component 50 is provided for cooperation with a portion of the female die surface 25. The male die component 50 has a surface, illustrated generally by reference numeral 51 in FIG. 2, that corresponds exactly to a central portion of the female die surface 25. A pair of upwardly extending locating flanges 53 are preferably provided associated with the block 20 for receiving the die 50 therebetween. An apparatus for applying a clamping force tightly pressing the surface 51 toward engagement with the surface 25 (with the band 13 and strips 11 therebetween) is also provided. This clamping force may be provided by a hydraulic cylinder, as illustrated schematically by reference numeral 55 in FIG. 3, by a manual screw clamp arrangement, or the like. The flanges 53 prevent unwanted movement of the block 50 with respect to the block 20.

The rollers 17, 18, and associated structures, comprise means for applying tension to the band 13 exterior of the male die 50.

In order to facilitate cure of the adhesive 12 while the strips 11 are being held by the apparatus 15, a chemical cure accelerator could be utilized, or the glue could be exposed to a radiation source to facilitate cure. For instance a source of microwave radiation, illustrated generally by reference numeral 57 in FIG. 3, can be provided in cooperation with the apparatus 15. Radiant heat, or other forms of heat (such as heat conducted through the blocks 20) could alternatively be utilized. Preferably, however, the blocks 20, 50 (and the surfaces 25, 51 thereof) are formed of wood, and the fast cure radiation source 57 is a microwave source.

Exemplary apparatus according to the present invention having been described, a typical method of producing a strip of laminated material according to the invention will now be set forth:

The strips 11, with adhesive 12, therebetween are placed together to form a linear laminate. Before curing of the adhesive 12, the linear laminate is bent to form a first portion, a second portion generally perpendicular to the first portion, and a third portion generally perpendicular to both the first and second portions. This is accomplished by placing one face of the linear laminate in contact with a portion of the female die surface 25, placing the flexible band 13 over the linear laminate, and moving male die member 50 into the position illustrated in FIG. 3, pressing the laminate into the configuration defined by the die surfaces 25, 51. The ends of the straps 13 are then brought into operative engagement with the rollers 17, 18 (as by the cooperating holes and projections 27, 28 interengaging), and the levers 32, 43 are rotated to tighten the band 13. This tightening action causes the strap 13 to bend the linear laminate so that the portions thereof exterior of male die 50 generally conforms to the female die surface 25.

The laminate is held in its bent position during curing thereof (see FIG. 3). Curing may be facilitated by exposure of the apparatus 15 to a fast-cure radiation source 57, such as a microwave source.

Finally, after curing the holding of the laminate is terminated to provide the final strip 10 of laminated material. The final strip 10 has first, second, and third mutually generally perpendicular portions. For instance for the exact configuration of the strip 10 illustrated in FIG. 4, either the portions 60, 61 can be considered a first portion, either of the portions 62, 63 can be considered a second portion, and the portion 64 can be considered a third portion.

The final laminated strip produced has as a typical use thereof decorative molding for furniture. For instance as illustrated in FIG. 4, the strip 10 is provided as an edge configuration for a chair 66. Merely by forming two strips 10, and affixing them to the edge configuration of the chair 66, it is possible to make the entire edge configuration for the chair. This compares to prior art processes wherein a number of individual strips would be required, each strip being joined to its adjacent strips. The invention also allows a wide variety of configurations heretofore extremely difficult to produce to be readily constructed. Also, the beauty of the final article is enhanced since there is a continuous flow of grain of the veneer.

It will thus be seen that according to the present invention a method and apparatus are provided for producing a strip of laminated material, such as wood veneer, the end strip having first, second, and third mutually generally perpendicular portions. The utilization of the strips according to the invention minimizes the number of joints, and thus costs associated with jointing, for the ultimate end product, and enhances the beauty of the final article produced (e.g. when used as decorative molding for a chair). While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent methods, apparatus, and products.

What is claimed is:

1. A method of making a strip of laminated material, utilizing a female die surface having first, second, and third mutually generally perpendicular portions, and being longer than the laminate, and a flexible band of substantially non-deformable material, the band having a length greater than the length of the female die surface; consisting of the steps of:

(a) placing together into a stack a plurality of similarly shaped strips of material, with adhesive, to form a linear laminate one strip wide, the width and length of each strip being substantially greater than the thickness thereof;

(b) before curing of the adhesive, bending the linear laminate to form a first portion, a second portion generally perpendicular to the first portion, and a third portion generally perpendicular to the first and second portions, by placing the linear laminate into contact with a portion of the female die surface, placing the flexible band over the linear laminate and in juxtaposition with the female die surface, and tensioning the band so that it applies a force to the linear laminate causing it to conform to the configuration of the female die surface;

(c) while holding the laminate in the bent position, effecting curing thereof; and (d) releasing holding of the laminate after curing to provide a final strip of laminated material with said first, second, and third mutually generally perpendicular portions.

2. A method as recited in claim 1 wherein step (c) is facilitated by exposing the laminate to a fast-cure radiation source.

3. A method as recited in claim 2 wherein step (c) is practiced by exposing the laminate to a microwave source.

4. A method as recited in claim 1 wherein step (b) is further practiced by moving a male die member, having a male die surface corresponding in shape to a central portion of the female die surface, to press the laminate into contact with the female die surface, with the band and laminate corresponding to the shape of the female die surface and with the ends of the band and the laminate extending past the male die portion; and applying a tension to the ends of the band to bring the end portions of the laminate into contact with the female die surface.

5. A method of making a strip of laminated material utilizing a female die surface having first, second, and third mutually generally perpendicular portions, and being longer than the laminate, and a flexible band of substantially non-deformable material, the band having a length greater than the length of the female die surface; comprising the steps of:

(a) placing together a plurality of similarly shaped strips of material, with adhesive, to form a linear laminate;

(b) before curing of the adhesive, bending the linear laminate to form a first portion, a second portion generally perpendicular to the first portion, and a third portion generally perpendicular to both the first and second portions, by placing the linear laminate into contact with a portion of the female die surface; placing the flexible and over the linear laminate and in juxtaposition wtih the female die surface; and tensioning the band so that it applies a force to the linear laminate causing it to conform to the configuration of the female die surface;

(c) while holding the laminate in the bent position, effecting curing thereof; and (d) releasing holding of the laminate after curing to provide a final strip of laminated material with said first, second, and third mutually generally perpendicular portions.

6. A method as recited in claim 5 further utilizing a male die member adapted to cooperate with a portion of the female die surface, and having a surface configuration corresponding to that of the portion of the female die surface with which it cooperates; and wherein step (b) is further practiced by applying a compressive force to the male die member moving it toward contact with the female die member to hold the laminate in place against the female die surface.

7. A method of making a strip of laminated material comprising the steps of:

(a) placing together a plurality of similarly shaped strips of material, with adhesive, to form a linear laminate;

(b) before curing of the adhesive, bending the linear laminate to form a first portion, a second portion generally perpendicular to the first portion, and a third portion generally perpendicular to both the first and second portions, by: placing the linear laminate in contact with a portion of a female die surface having first, second, and third mutually generally perpendicular portions; placing a flexible band of substantially non-deformable material over the linear laminate; moving a male die member, having a male die surface corresponding in shape to a central portion of the female die surface, to press the laminate into contact with the female die surface, with the band and laminate corresponding to the shape of the female die surface, and with the ends of the band and the laminate extending past the male die portion; and applying a tension to the ends of the band to bring the end portions of the laminate into contact with the female die surface;

(c) while holding the laminate in the bent position, effecting curing thereof; and (d) releasing holding of the laminate after curing to provide a final strip of laminated material with said first, second, and third mutually generally perpendicular portions.

8. Apparatus for making a strip of laminated material comprising:

a first roller rotatable about a first axis;

a second roller rotatable about a second axis, said second axis being distinctly non-parallel with said first axis;

a female die surface extending continuously from said first roller to said second roller;

a male die surface conforming to a central area of said female die surface between said first and second rollers, and having a length substantially less than the length of said female die surface;

a flexible band of substantially non-deformable material, said band having a length greater than the length of said female die surface extending between said rollers;

means for attaching the ends of said flexible band to said rollers;

means for applying a force to said male die surface moving it toward said female die surface; and means for rotating said rollers about their axes of rotation with the band held thereby to tension said band and cause said band to closely conform to the shape of said female die surface.

9. Apparatus as recited in claim 8 wherein said first and second axes are stationary with respect to each other.

10. Apparatus as recited in claim 8 wherein said female die surface is formed on a block, and said male die surface is formed on a block, and further comprising receiving flanges operatively associated with said blocks to stabilize the position of said blocks with respect to each other when a force is being applied by said means for applying a force to said male die surface.

11. Apparatus as recited in claim 10 wherein said die blocks, and die surfaces thereof, are wooden.

12. Apparatus as recited in claim 8 wherein said means for rotating said rollers comprise, associated with each roller; a shaft having a key, a ratchet gear in key-receiving association with said shaft; a pawl in operative association with said ratchet gear; and a bar operatively attached to said shaft for effecting rotation thereof.

13. Apparatus for making a strip of laminated material with first, second, and third mutually generally perpendicular portions, comprising:

a continuous female die surface having first, second, and third mutually generally perpendicular portions corresponding to the portions of the strip of laminated material to be formed, and said die surface being longer than the strip to be formed;

a flexible band of substantially non-deformable material, said band having a length greater than the length of said female die surface; and means for applying force to said band so that said band is forced into close conformance with said female die surface.

14. Apparatus as recited in claim 13 wherein said means for applying force to said band includes a male die member having a male die surface corresponding to a central portion, but only a portion, of said female die surface; means for pressing said male die surface into operative engagement with its corresponding portion of said female die surface; and means for tensioning portions of said band extending outwardly from between either end of the cooperating portions of said male and female die surfaces.

15. Apparatus as recited in claim 14 wherein said means for tensioning said band ends comprise a first roller rotatable about a first axis, and a second roller rotatable about a second axis, said second axis being skew and stationary with respect to said first axis; means for attaching the ends of said band to said rollers; and means for rotating said rollers about their axes of rotation with said band held thereby to tension said band.

16. Apparatus as recited in claims 8 or 13 wherein said flexible band is constructed of woven nylon.

* * * * *

UNITED STATES PATENT AND TRADEMARK OFFICE

CERTIFICATE OF CORRECTION

PATENT NO. : 4,495,019

DATED : January 22, 1985

INVENTOR(S) : Richard K. Ogg

It is certified that error appears in the above-identified patent and that said Letters Patent is hereby corrected as shown below:

Column 6, Line 30:

"and" should be --band--; and

Column 6, Line 31:

"wtih" should be --with--.

Signed and Sealed this

*First* Day of *October 1985*

[SEAL]

*Attest:*

DONALD J. QUIGG

*Attesting Officer*

*Commissioner of Patents and Trademarks—Designate*